W. E. CULLEY.

SEPARABLE TOOTH SAW.

APPLICATION FILED JUNE 2, 1920.

Reissued Feb. 15, 1921. 15,038.

INVENTOR Walter E. Culley

BY Reuben L. Roberts

ATTORNEY.

UNITED STATES PATENT OFFICE.

WALTER E. CULLEY, OF FITCHBURG, MASSACHUSETTS, ASSIGNOR TO SIMOND'S MANUFACTURING COMPANY, OF FITCHBURG, MASSACHUSETTS, A CORPORATION OF MASSACHUSETTS.

SEPARABLE-TOOTH SAW.

15,038. Specification of Reissued Letters Patent. Reissued Feb. 15, 1921.

Original No. 1,308,541, dated July 1, 1919, Serial No. 294,410, filed May 3, 1919. Application for reissue filed June 2, 1920. Serial No. 386,092.

*To all whom it may concern:*

Be it known that I, WALTER E. CULLEY, a citizen of the United States of America, residing at Fitchburg, in the county of Worcester and Commonwealth of Massachusetts, have invented certain Improvements in Separable-Tooth Saws, of which the following is a specification.

This invention relates to saws having separable or inserted teeth, and consists in the improved means for holding such teeth securely in place in the saw-plate and preventing any lateral movement between the teeth and the locking-plate as hereinafter described and shown.

Figure 1:
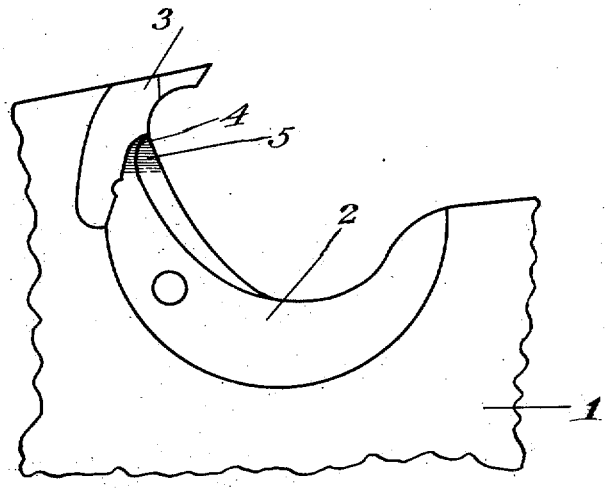
Figure 2:
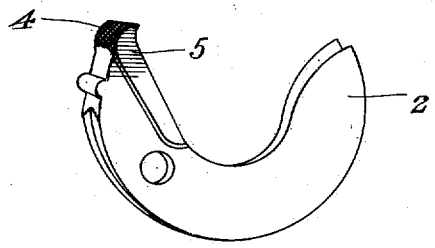

In the drawings forming a part of the specification, Figure 1, is a side elevation of a portion of a saw plate with a tooth and the improved locking-plate therefor, in place in the curved recess in the saw-plate; Fig. 2, is a perspective view of the improved locking-plate with the roughened and hardened portion on the inner surface at the top, to engage the tooth.

Referring to the various portions of the drawings by designating characters, 1, is the saw-plate, 2, the tooth-locking or holding plate, 3, the separable tooth, 4, the knurled or roughened portion of the locking-plate at the tip and 5, the highly tempered or hardened portion, indicated by shading lines.

When the tooth and its locking-plate are inserted in place in the saw-plate and forced tightly together, the hardened portion, or the knurls on the roughened portion of the locking-plate will be embedded in the surface of the softer metal of the tooth and thus prevent any lateral movement of the tooth in relation to such plate and thereby obviate the customary objection of having the teeth work loose and frequently fly out of the saw-plate. As shown, the hardened and the roughened portions of the locking-plate are on the inner edge at the top, but it is obvious that the hardened and the roughened portions may be along any part of the edge which comes to a bearing on the edge of the separable tooth.

The highly tempered and roughened parts are preferably located at the tip of the locking-plate as it is thus nearer to the cutting point of the tooth where the greatest strain comes. The roughening of the tip of the locking-plate may be omitted, as the hardening to a high degree, of this part of the plate, will be found sufficient to cause it to grip the softer metal of the tooth against which it is pressed.

I claim:

1. In a separable-tooth saw, a locking-plate having a portion thereof which bears upon the separable tooth, knurled or roughened, and such portion hardened to a high degree, whereby when such plate and tooth are firmly pressed together, the hardened portion will be embedded in the surface of the softer metal of the tooth and thereby prevent relative lateral movement of the parts.

2. In a separable-tooth saw, a clamping bit or plate having its tip or upper end hardened to a high degree and the inner surface thereof roughened, whereby parts of the roughened surface will engage the softer metal of the tooth when the two are firmly pressed together and thereby prevent lateral movement of the one in relation to the other.

3. In a separable-tooth saw, a clamping-plate having a portion thereof which bears upon the separable-tooth, hardened to a high degree, whereby when such plate is firmly pressed against the tooth its hardened metal will grip the softer metal of the tooth and prevent lateral relative movement of the parts in contact.

WALTER E. CULLEY.